United States Patent
Lyons

(10) Patent No.: US 9,036,161 B1
(45) Date of Patent: May 19, 2015

(54) LABEL EDGE DETECTION USING OUT-OF-PLANE REFLECTION

(71) Applicant: Gregory Jon Lyons, Omaha, NE (US)

(72) Inventor: Gregory Jon Lyons, Omaha, NE (US)

( * ) Notice: Subject to any disclaimer, the term of this patent is extended or adjusted under 35 U.S.C. 154(b) by 19 days.

(21) Appl. No.: 13/854,918

(22) Filed: Apr. 1, 2013

(51) Int. Cl.
*G01B 11/14* (2006.01)

(52) U.S. Cl.
CPC .......... *G01B 11/14* (2013.01); *B65H 2701/131* (2013.01)

(58) Field of Classification Search
USPC .......... 356/614–624, 630; 250/559.4, 559.44, 250/559.36, 566
See application file for complete search history.

(56) References Cited

U.S. PATENT DOCUMENTS

| | | | |
|---|---|---|---|
| 3,890,509 A * | 6/1975 | Maxey | 250/559.25 |
| 4,281,696 A * | 8/1981 | Howard et al. | 144/357 |
| 4,308,461 A * | 12/1981 | Tuomaala | 250/559.25 |
| 4,685,982 A | 8/1987 | Kucheck | |
| 4,782,238 A * | 11/1988 | Radl et al. | 250/559.36 |
| 4,867,833 A | 9/1989 | McCoy | |
| 5,504,345 A * | 4/1996 | Bartunek et al. | 250/559.4 |
| 5,598,345 A * | 1/1997 | Tokura | 382/150 |
| 5,841,881 A * | 11/1998 | Iwakawa et al. | 382/101 |
| 6,460,765 B1 | 10/2002 | Priesbsch | |
| 6,621,092 B1 * | 9/2003 | Furuta et al. | 250/559.4 |
| 6,710,364 B2 * | 3/2004 | Guldi et al. | 250/559.44 |
| 6,710,887 B2 * | 3/2004 | Krause | 356/614 |
| 6,825,486 B1 * | 11/2004 | Cole et al. | 250/559.4 |
| 6,950,181 B2 * | 9/2005 | Chen et al. | 356/218 |
| 8,125,654 B2 | 2/2012 | Benvegnu | |

* cited by examiner

Primary Examiner — Sang Nguyen
(74) Attorney, Agent, or Firm — Michael Coblenz

(57) ABSTRACT

This disclosure describes an optical method of detecting the presence of pressure-sensitive labels, using the reflective properties of their edges. Labels that are removably attached to a liner are moved through a light beam that is directed across their direction of motion so the light impinges on the labels at a predetermined angle of incidence. The light remains in its plane of incidence when it reflects off all parts of the liner and labels except the labels' edges. Due to the angularity of the labels' edges, the light beam is deflected out of the plane of incidence upon reflection off the edges, thus enabling detection of the label edges by light reflected out of the plane of incidence.

10 Claims, 9 Drawing Sheets

LABEL EDGE DETECTION USING OUT-OF-PLANE REFLECTION

BACKGROUND

Prior Art

The method and devices described here relate to any operation where it's necessary or beneficial to detect either the simple presence or the exact position of a pressure-sensitive label. Examples of such operations can occur during the manufacture of the labels, when the labels are being applied to objects by a machine, when the labels on a roll need to be counted, and so on.

Pressure-sensitive adhesive-backed labels are often supplied in a continuous web. The web consists of a backing sheet (or carrier web, or backing—but hereafter in this disclosure called the liner) that is made in a way that allows labels attached to it to be readily removed without damage, and then permanently re-applied onto something else. The liner can be made from a material that has been pretreated on the label side to be slippery, thus allowing easy removal of the labels. Or the liner can be made from a material to which the labels naturally do not permanently adhere. On that liner is a continuous row of labels. So the web comprises the liner, together with all the labels that are attached to it. The labels that are removably attached to these long, continuous liners may be one or the other of two kinds: die-cut labels or butt-cut labels.

Die-cut labels have a typical gap of 3.175 mm (0.125 inch) between adjacent labels, and are narrower than the liner on which they're manufactured, so there is exposed liner all around every die-cut label.

Butt-cut labels, however, are attached to the liner edge-to-edge with no space between adjacent labels, and may extend all the way across the width of the liner to which they're removably attached. They have very narrow slits the width of the thickness of the cutting blade edge that formed the edges of adjacent labels. So butt-cut labels make more efficient use of material, since there are no empty gaps between them in a roll, but they are more difficult to detect for automated processing unless registration marks are printed on either the labels themselves or the liner to which they're removably attached.

When labels are applied to products by machine they're most often detected by capacitive, ultrasonic, vision, or photoelectric-type sensors.

Capacitive sensors can have problems if there is any conductive material in the liner or the labels. So their use can be problematic if the labels contain any metallic films or inks. Capacitive sensors are also problematic with butt-cut labels (regardless of their material content), because there is so little difference in the capacitance in the slits between the labels compared to the capacitance of the unslitted material of the labels themselves.

Ultrasonic sensors can work on die-cut labels of any material, but they also have problems detecting the edges of butt-cut labels, because they also have a hard time distinguishing the slits between the labels from the labels themselves.

Vision systems are generally used for label inspection rather than for simple detection of the location of labels due to their cost and complexity.

The remaining sensing technology commonly being used to detect label presence and/or location is photoelectric sensing. Photoelectric sensors are used in several different ways to detect labels' presence and/or position, depending on the type of photoelectric sensor that's chosen.

But the problem to-date with label detection using photoelectric sensors has been that detection is very dependent on the optical properties of the labels and the liner. And the optical characteristics of labels and liners can be all over the place: from clear to opaque, different colors, and reflective surface characteristics ranging from nearly mirror-like to diffuse. Achieving a design for a photoelectric sensor such that a single sensor can reliably detect die-cut labels made from all kinds of material and printing is difficult, and has been elusive so far.

And the detection of butt-cut labels by photoelectric or any other means continues to elude sensor designers unless registration marks are used, or the labels are actually partially removed from the liner such as described in U.S. Pat. No. 4,867,833 (McCoy, Sep. 19, 1989).

The McCoy patent discusses a method of detecting the position of butt-cut labels by passing the web over a curved surface. The curvature of the surface is chosen so the label edges become partially unstuck from the liner as the web is flexed when it moves and curls over the curvature. That accentuates the gap between the labels and enables the detection of the label edges with one of several off-the-shelf sensors.

The curvature required to do this, however, depends on the stiffness of the labels and the strength of bonding between the labels and the liner. So a device built according to McCoy could potentially work for some butt-cut labels and not for others: for example, if much thinner and more flexible label material was used, or if a more sticky adhesive were used. Also, once the label edges have become partially dislodged from the liner, it's possible they could become further dislodged to the point that they could stick to some object along their path, and cause a jam. This is a sensing tactic that may be useful when the labels are going to be immediately removed from the liner after sensing and applied to product, but may be problematic for other applications, such as counting the labels on a roll or checking for missing labels.

There is also the question of positional accuracy of label detection done this way. Today's capacitive label sensors claim positional accuracy of 0.4 mm (0.016 inch). The McCoy patent does not tell us how accurately the edge detection is once the edges of butt-cut labels are dislodged from the liner. But even if the label-edge detection is done repeatably for a specific label, it's possible that the positional accuracy will change from one specific label to another due to the differences in label stiffness and adhesive strength as mentioned earlier—possibly even for the same specific label when purchased from different suppliers or in different lots from the same supplier.

All other methods I've found to-date for detecting the position of butt-cut labels involve registration marks of some kind on the labels or liners. There has been a bit more of a variety of approaches to the problem of detecting die-cut labels, with clear die-cut labels receiving the most interest.

U.S. Pat. No. 4,685,982 (Kucheck, Aug. 11, 1987) describes a way to detect die-cut labels' position regardless of their opacity by detecting the gaps between them. It involves directing a light beam from above the side of the web down toward the labels' surfaces (forming an acute angle with the labels' surfaces). At about the point on the labels where the light beam hits the labels, there is an opaque bar that extends in the direction of the labels' motion. The bar is positioned such that it just barely clears the tops of the labels. So when a gap between labels moves through the light spot, the light passes under the bar and reflects off the surface of the liner, to be detected on the other side of the web. There is some discussion in Kucheck of the angle of incidence for the light beam, but nothing regarding its diameter.

But any method that relies on light reflecting off the surface of the liner does not work for detecting the position of butt-cut labels, because on the label-side of the web, there is none of the liner's surface exposed between labels. So the label-sensing method described in Kucheck does not work for butt-cut labels.

Neither of the above prior art patents made use of the edges of the labels in the process of detecting the labels. But U.S. Pat. No. 6,460,765 (Priesbsch, Oct. 8, 2002) does. This patent exploits the fact that, due to the way die-cut labels are made, the edges of the labels are not perpendicular to the top label surfaces. When viewed in cross-section, the edges have varying degrees of angularity. So the Priesbsch patent emits a small-diameter light beam down onto the passing labels perpendicularly from above, and uses the shape of the label edges to redirect some of the light beam into clear die-cut labels using refraction. Then the light reflects around inside the label, eventually exiting the top and bottom side of the label, where it impinges on one of the sensing receivers after having been displaced from its original path.

However, edge-refraction into the clear label material as described in Priesbsch only works for clear labels—not for labels made of opaque material. So the Priesbsch patent essentially reverts back to prior art technology of transmitting light through the labels and liner and then comparing light levels with threshold values to decide whether a label or gap has passed through the light beam when it's dealing with opaque labels.

U.S. Pat. No. 5,841,881 (Iwakawa et al, Nov. 24, 1998) uses edge-reflection to detect the position of address labels and address windows on postal packages. The method uses a vision system, but the illumination and optical design used to acquire the image data is of some interest here in terms of prior art. FIGS. 3A and 3B in Iwakawa show cross-sectional views of label edges, and rays illustrating the necessity for the light supplied by the light sources in Iwakawa to be converging as it approaches the label edges (FIGS. 3A and B in Iwakawa; column 4, lines 30-31; and claim 7).

Iwakawa also states that the optical axis of the lens that focuses the light reflected off the label edges onto the image sensor is perpendicular to the plane formed by the conveyor, and hence the top surface of the labels (column 4, lines 4-6).

U.S. Pat. No. 8,125,654 (Benvegnu et al, Feb. 28, 2012) uses edge-reflection of light to determine if the outside edge of a circular semiconductor wafer has been sufficiently polished. But the emphasis is more on spectrographic content of the reflected light than on the direction in which the light has reflected off the edge. And in one of the embodiments, the light beam is directed in a plane that intersects the center of the circular disk-shaped wafer (column 9, lines 35-52).

So there is very little in the prior art regarding the detection of butt-cut label edges, and few prior art examples of photoelectric sensors capable of detecting all kinds of die-cut labels. Today I know of no sensor short of a vision system that can detect both die-cut and butt-cut labels made of any material.

Advantages of the Current Invention

The current invention will detect the position of die-cut label edges regardless of the material used in either the labels themselves or the liner on which they're supplied by the manufacturer. And it will detect them equally well regardless of the optical and electrical properties of either the labels or the liner to which they're attached. The label edge detection will not require any registration marks on either the labels or the liner to which they're attached, and it will be largely indifferent to changes in the surface texture of the labels.

But more importantly, it will do all the above for butt-cut labels, as well; which (to my knowledge) no one else has yet achieved. I have yet to prototype a complete sensor using this technology, but from my experimentation to-date, I expect to be able to make a sensor that will be able to detect butt-cut and die-cut labels interchangeably and without any adjustments on the part of the machine operator.

SUMMARY

The method and devices described in this disclosure constitute a new photoelectric sensor scan type that will be able to detect the edges of butt-cut and die-cut labels as they pass through a small-diameter light beam. The light beam is directed across the labels' direction of motion, and inclined down at a predetermined angle from horizontal (assuming the labels are attached to the top of the web). At small angles of incidence, the reflection of light off different materials' surfaces is much more similar than it is as the angle of incidence approaches perpendicularity. So a small angle of incidence in the vertical direction assures the sensing method works similarly for all label materials, regardless of color, opacity, electrical properties, and gloss.

When the light beam impinges on any portion of the labels or liner that is flat (e.g., a label surface or the liner surface in the gaps between labels), the light beam remains in the plane of incidence after reflection off that surface. But the way die-cut and butt-cut labels are currently made results in their edges having an angularity or curvature to them when viewed in cross section. So when the light beam reflects off them, it's redirected out of the plane of incidence in a predictable way. And when light sensing detectors are mounted in those predictable positions, then it's possible to detect the presence of label edges when the light beam reflects off them.

Due to the geometry of the labels' edges, the light reflects off leading label edges in a different direction than it does for trailing label edges. So a label sensor manufactured to use these reflective characteristics could sense the direction of motion of the labels.

And since the sequence of light reflections is different for butt-cut versus die-cut labels, a label sensor manufactured to use these reflective characteristics could also determine whether it was detecting the edges of butt-cut or die-cut labels without requiring a manual setup or adjustment when switching between label types.

DRAWINGS

REFERENCE NUMERALS

Figure 1:
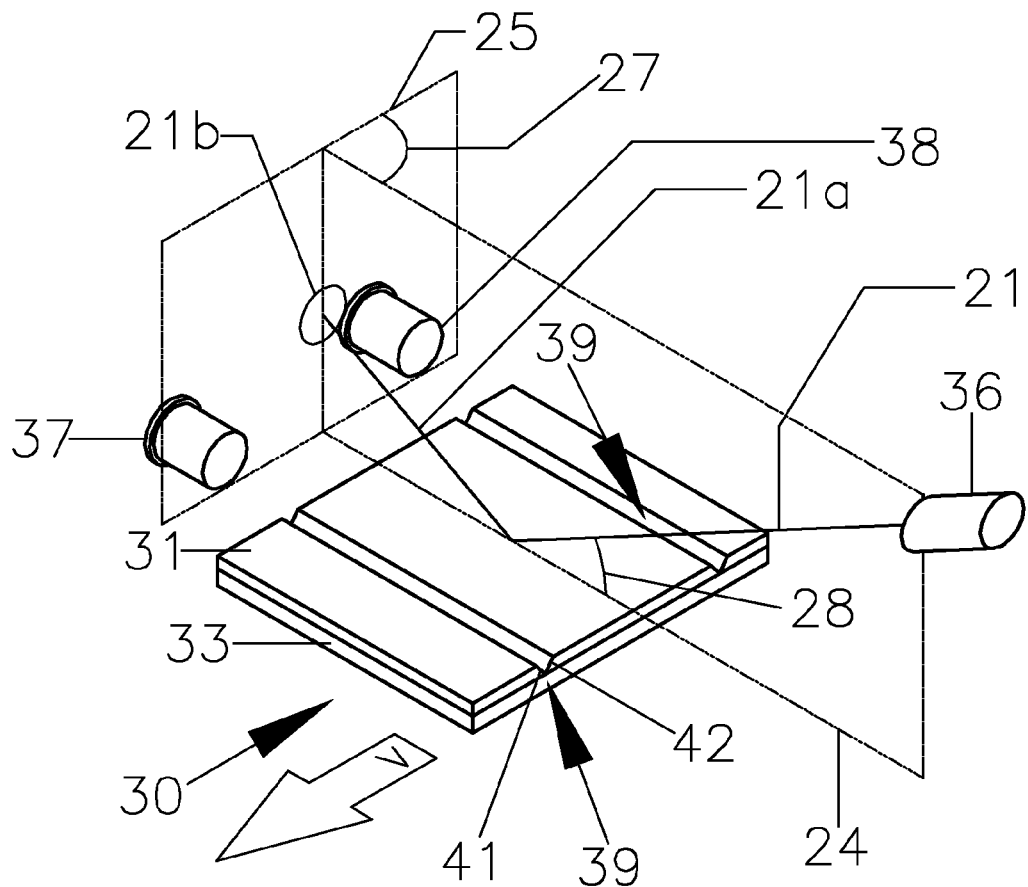
FIG. 1 shows the reflection of light off the surface of a butt-cut label, and how it remains in the incidence plane after reflection (1st embodiment).

21 Incident ray
21a Reflected ray (in-plane)
21b Light spot (formed in the detector plane & incidence plane)
22 Reflected rays (to the left of incidence plane)
22a Light spot (formed in the detector plane) to the left of incidence plane
23 Reflected rays (to the right of the incidence plane)
23a Light spot (formed in the detector plane) to the right of incidence plane
24 Incidence plane
25 Detector plane
27 Angle (between plane of incidence and the detector plane)
28 Incidence angle
30 Web
31 Label (butt-cut)
32 Label (die-cut)
33 Liner
35 Multi-pixel photodetection device
36 Light source
37 Photodetector
38 Photodetector
39 Slit
40 Gap
41 Trailing label edge
42 Leading label edge
50 Incidence position: butt-cut labels, label surface
51 Incidence position: butt-cut labels, entering slit 39
52 Incidence position: butt-cut labels, centered in slit 39
53 Incidence position: butt-cut labels, exiting slit 39
60 Incidence position: die-cut labels, label surface
61 Incidence position: die-cut labels, illuminating trailing label edge 41
62 Incidence position: die-cut labels, illuminating gap 40 surface
63 Incidence position: die-cut labels, illuminating leading label edge 42
V Direction of web motion
L Logic level indicating photodetector is illuminated
D Logic level indicating photodetector is dark (not illuminated)

DETAILED DESCRIPTION

First Embodiment

Figure 3:
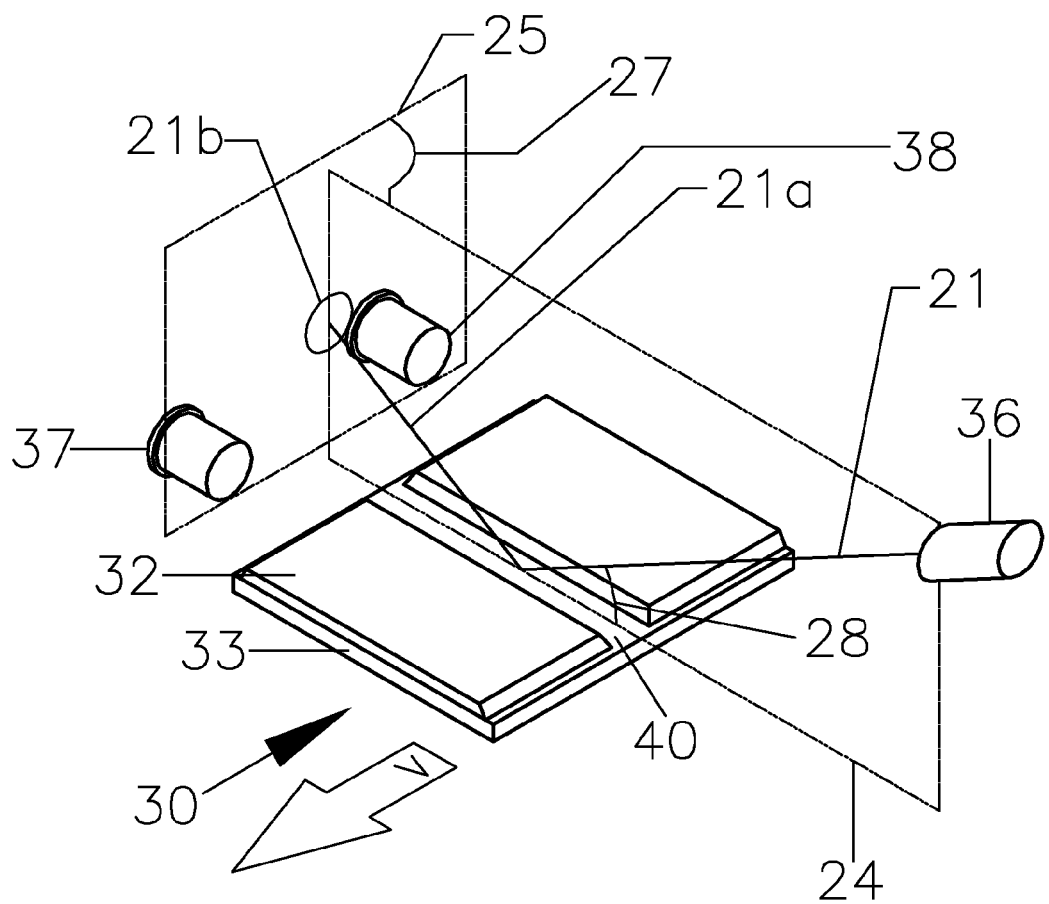
FIG. 3 shows the reflection of light off the gap between adjacent die-cut labels, and how it remains in the incidence plane after reflection (1st embodiment).

FIG. 3 shows parts of the first embodiment of a sensor designed to use out-of-plane reflection of light off label edges to detect the location of die-cut labels.

In FIG. 3 there is a light source 36 that emits a small beam of light whose direction is represented schematically in this disclosure by an incident ray 21. Hereafter in this disclosure, the entire beam of light will be referenced as incident ray 21. Light source 36 may include some parts not shown, including a light-emitting or laser diode and whatever optical components are required to shape the light from that diode into a small light beam. Those parts are not shown, because the use of light-emitting and laser diodes, lenses, and apertures to produce light beams is well-known to those experienced in the art.

Experimentation has shown that if incident ray 21 is about 0.5 mm (0.02 inch) in diameter, it will work with label material that is 0.069 mm (0.0027 inch) thick as-described in this disclosure, however different diameters may be usable, especially for other material thicknesses, or for a range of material thicknesses. But making the diameter of incident ray 21 too large relative to the label edges may result in more light reflecting in unwanted directions, which may adversely affect the ability to detect light that reflects off the label edges.

Also in FIG. 3 is a web 30 that comprises a continuous liner 33, to which a number of die-cut labels 32 are removably adhered, with each adjacent pair of labels separated by a gap 40. Web 30 from time-to-time or continuously moves in the path or direction V shown by the hollow arrow.

Incident ray 21 lies in an incidence plane 24 and sequentially impinges on the top surface of liner 33 in gap 40, the top surface of the next label 32, the top surface of liner 33 in the next gap 40, the top surface of the next label 32, and so on as web 30 moves. Light source 36 is positioned and aligned so that incident ray 21 impinges on the passing web 30 at an incidence angle 28.

After incident ray 21 reflects off gap 40 between labels 32, the light becomes a reflected ray 21a. Hereafter in this disclosure, the entire beam of reflected light that remains in incidence plane 24 will be referenced as reflected ray 21a.

The kind of light reflection used by this disclosure occurs at values of incidence angle 28 from less than 1° all the way up to about 45°. So a sensor using this method may be able to use any number of values of incidence angle 28 within that range and still be able to function as described here. But values of incidence angle 28 in the low-end of that range will probably tend to be preferred, except for the 2nd embodiment described further below.

The reason is that when incidence angle 28 is small, the reflective differences between different materials, colors, and surface textures is reduced. It makes a surface that normally would reflect light diffusely reflect light in a more specular manner. A small incidence angle 28 also enhances the reflective properties of clear label material for our purposes: it reduces the amount of light that penetrates into the label material, so the reflective performance becomes more affected by surface features than by the material's optical properties. I personally prefer angles in the range of 7-20° for incidence angle 28 in this first embodiment.

Reflected ray 21a remains in incidence plane 24, and impinges on a light spot 21b in a detector plane 25. Detector plane 25 forms an angle 27 with incidence plane 24. In this first embodiment of this label detection method, angle 27 is 90°, so incidence plane 24 and detector plane 25 are perpendicular to each other. Detector plane 25 is also parallel to the direction of motion V of web 30, which makes incidence plane 24 perpendicular to the direction of motion V of web 30.

Figure 4:
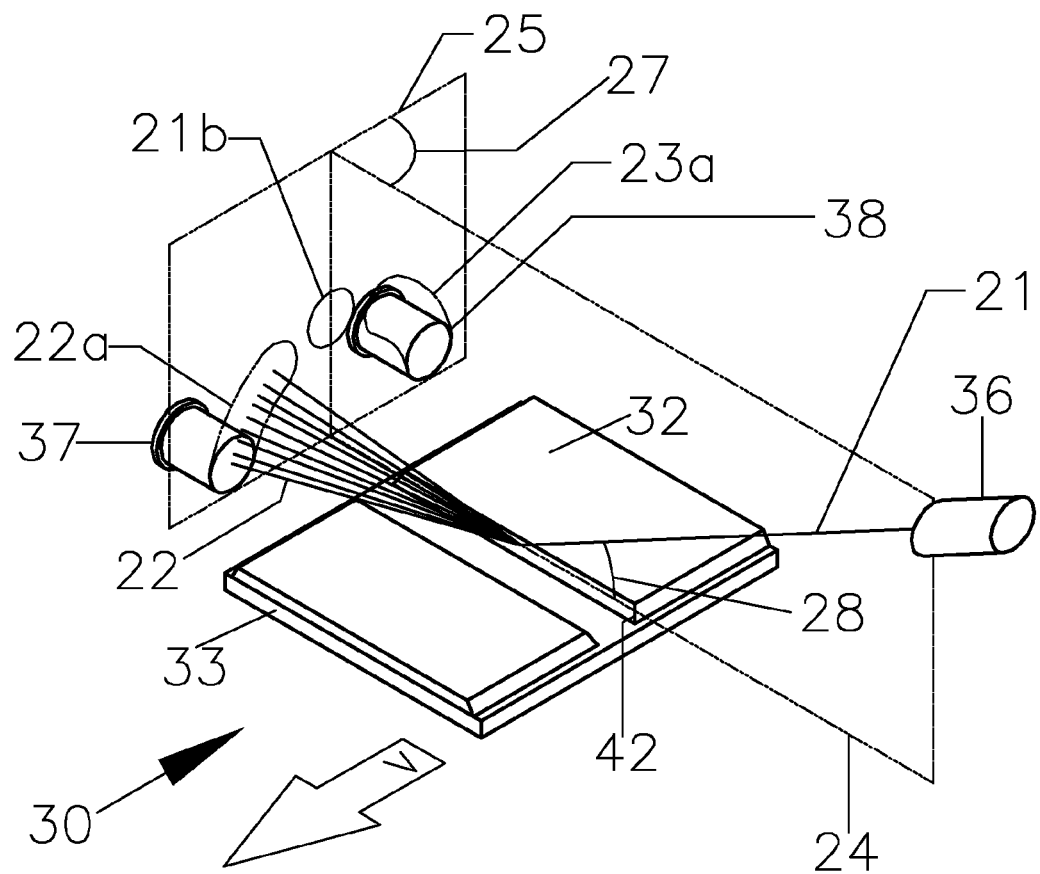
FIG. 4 shows the reflection of light off the leading edge of a die-cut label, and how it reflects to the left of the incidence plane after impinging on the leading edge of the die-cut label (1st embodiment).

FIG. 4 shows web 30 in a position such that incident ray 21 impinges on a leading label edge 42 of label 32. Due to the cross-sectional geometry of edge 42 and incidence angle 28, the reflected light rays 22 reflect out of and to the left of incidence plane 24 and impinge on detector plane 25 throughout the light spot 22a. Reflected rays 22 are shown as a plurality of rays to illustrate the fact that the light is no longer a small beam, but has been redirected by its reflection off edge 42 into a wider, curved beam of light with a cross-sectional shape that is approximated by the shape of light spot 22a.

However, the intensity of light is not necessarily uniform throughout light spot 22a. Experimentation to-date indicates that the light intensity may be greatest toward the bottom of light spot 22a where a photodetector 37 is shown. So FIG. 4 schematically shows the detection of the leading edge of a die-cut label on a liner. So FIG. 4 shows that the label-edge position in which leading label edge 42 is detected is the position where incident ray 21 impinges on leading label edge 42.

Figure 5:
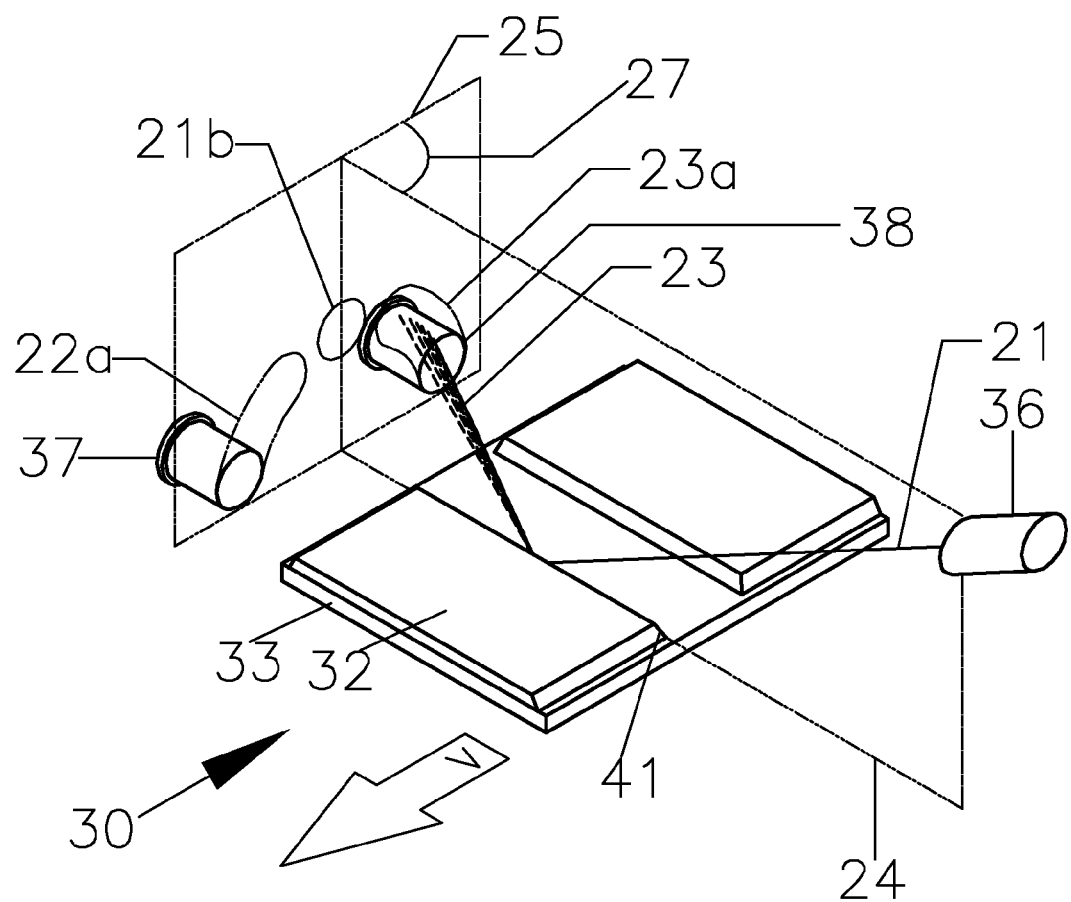
FIG. 5 shows the reflection of light off the trailing edge of a die-cut label, and how it reflects to the right of the incidence plane after impinging on the leading edge of the die-cut label (1st embodiment).

FIG. 5 shows web 30 in a position such that incident ray 21 impinges on a trailing label edge 41 of label 32. The situation is similar to that shown in FIG. 4, except reversed. Incident ray 21 now impinges on edge 41, which reflects the light rays out of incidence plane 24, and they become the reflected rays 23, that have been reflected out of and to the right of incidence plane 24. The reflected rays 23 then impinge on detector plane 25, forming a light spot 23a, possibly with an area of greater intensity toward the bottom of the pattern, where a photodetector 38 is shown. So FIG. 4 schematically shows the detection of the trailing edge of a die-cut label on a liner. And FIG. 5 shows the label-edge position in which trailing label edge 41 is detected, which is the position where incident ray 21 impinges on trailing label edge 41.

Photodetector 37 and photodetector 38 are shown throughout this disclosure without any lenses, because the advantages of some kind of optics to aid in redirecting and concentrating the light is well understood by those skilled in the art, and would be included as-needed in any design.

FIG. 1 is the same as FIG. 3 except for two details. The first difference is that FIG. 1 shows a series of butt-cut labels 31, whereas FIG. 3 uses labels 32 that are spaced-apart and die-cut for illustration. The second difference between them is that FIG. 3 shows incident ray 21 impinging on gap 40 between two labels 32, whereas FIG. 1 shows that ray impinging on the top surface of label 31. The reason both Figs. were included was to emphasize the fact that when incident ray 21 impinges on a flat surface, regardless of whether it's the top of either a die-cut or a butt-cut label, or the surface of the liner in the gap between die-cut labels, the reflected ray 21 remains within incidence plane 24 and impinges on light spot 21b. Since there is not a photodetector located in the vicinity of light spot 21b, the light reflecting to that spot is undetected.

Figure 2:
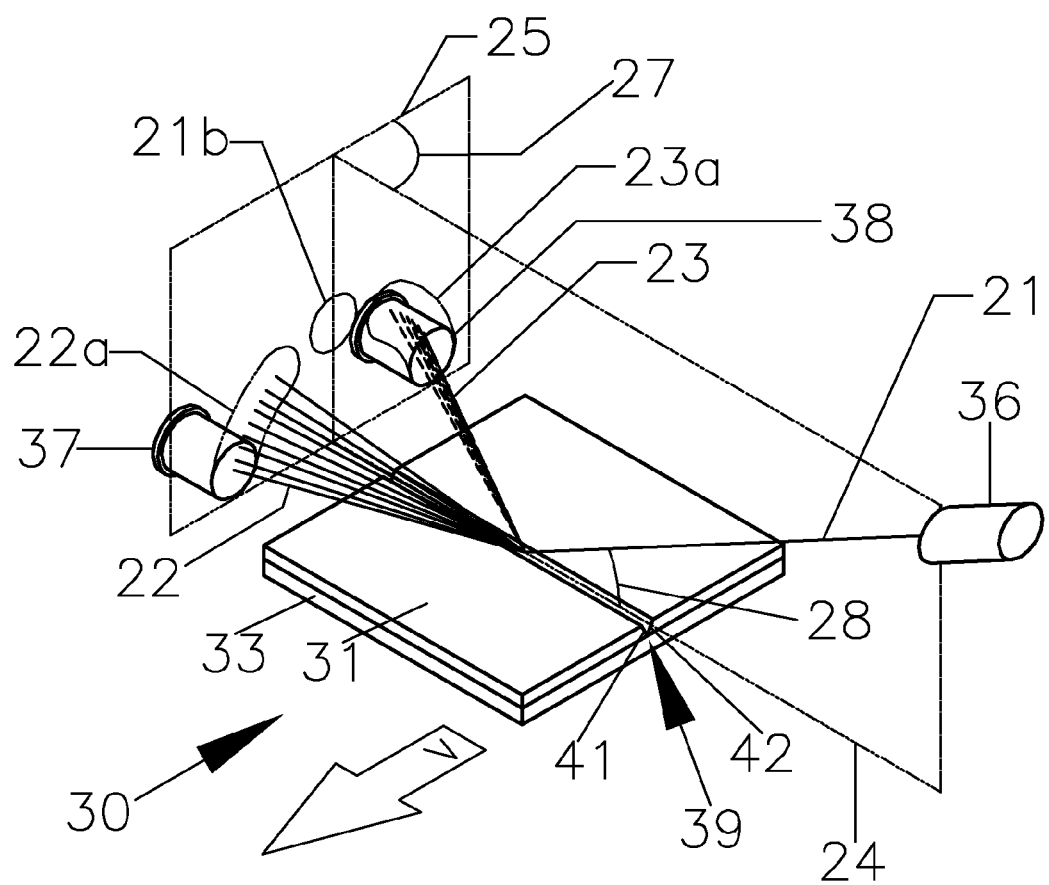
FIG. 2 shows the reflection of light off the slit between adjoining butt-cut labels, and how it reflects to both sides of the incidence plane after impinging on the slit between adjoining butt-cut labels (1st embodiment).

FIG. 2 shows the first embodiment of this label sensing method with web 30 positioned such that incident ray 21 impinges on a slit 39 that comprises trailing label edge 41 and leading label edge 42 essentially butted right up against each other on liner 33 with no space between them. In this situation, there is light reflected out of incidence plane 24 both to the right and to the left. So FIG. 2 schematically shows the detection of adjacent butt-cut labels' adjacent edges. It also shows the label-edge position at which both trailing edge 41 and leading edge 42 of adjacent labels 31 are detected.

Let's first consider this as a static situation, where the web is positioned as-show, with no movement. Trailing label edge 41 reflects the light impinging on it as reflected rays 23 out of incidence plane 24 into light spot 23a in detector plane 25. And at the same time, leading label edge 42 reflects the light that impinges on it as reflected rays 22 out of incidence plane 24 into light spot 22a in detector plane 25. The information provided by the static situation alone enables the detection of the edges of butt-cut labels. But considering what happens as web 30 moves in direction V also enables a label sensor using this embodiment to know whether it's detecting butt-cut or die-cut labels, as will be shown next.

Figure 9:
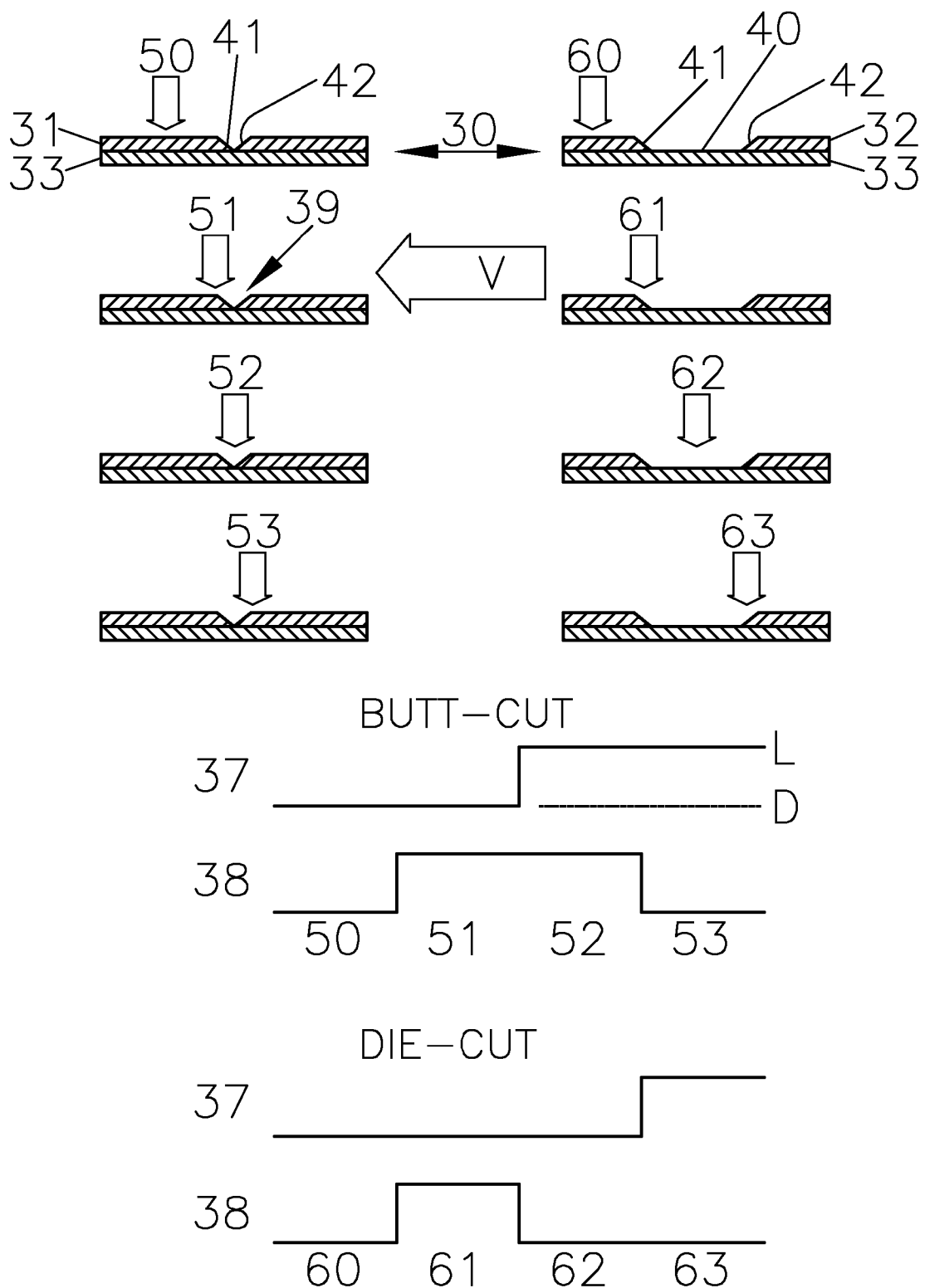
FIG. 9 is a state diagram to show the difference in sensing butt-cut versus die-cut labels that makes it possible for the sensor to detect which kind of labels it's sensing in addition to edge location (1st embodiment).

To consider the dynamic situation when web 30 is moving, see FIG. 9.

In the top part of FIG. 9 are views of cross-sections of short segments of web 30 taken length-wise along the web. On the left is shown web 30 with butt-cut labels 31. On the right is shown web 30 with die-cut labels 32. V inside a large hollow arrow pointing to the left indicates the direction web 30 is moving. The 8 smaller hollow arrows pointing down with numbers above them represent different positions where incident ray 21 impinges on web 30 as the web moves from right to left.

In the bottom part of FIG. 9 are two diagrams that look similar to timing diagrams, but which are probably more accurately called state diagrams, because the horizontal "time" axis has been distorted to emphasize the sequence of states. One of the diagrams is for butt-cut labels, and the other is for die-cut labels. The diagrams show which illumination state photodetector 37 and photodetector 38 are in for each of the positions where incident ray 21 impinges on web 30 indicated by the downward-pointing hollow arrows. A high level, labeled L for "light", indicates that photodetector is being illuminated by light reflecting off web 30. But the low level, labeled D for "dark" indicates that photodetector is not being illuminated by light reflecting off web 30.

When incident ray 21 impinges on the surface of butt-cut label 31 at an incidence position 50, no light reflects onto either photodetector 37 or 38. The same situation exists when incident ray 21 impinges on the surface of die-cut label 32 at an incidence position 60. There is no light reflected onto either photodetector 37 or 38.

For ease of explanation, I will discuss the "movement" of incident ray 21 in preference to discussing the movement of web 30. From a physics point of view, this is much like choosing a more convenient coordinate system to make the equations simpler. But in this case, it will make the descriptive language clearer. So we will imagine incident ray 21 moving along each cross-sectional view of web 30 from left-to-right for the duration of our discussion of FIG. 9.

Also, for explanation purposes, let's imagine that the width of the vertical downward-pointing hollow arrows represent, to some extent, the width or diameter of incident ray 21.

As incident ray 21 moves to the right over web 30 with butt-cut labels 31 on it, it reaches an incidence position 51 where it completely illuminates trailing label edge 41, but has not yet started to illuminate any of the leading label edge 42 of the next label 31. Thus photodetector 38 is illuminated, while photodetector 37 is not. When incident ray 21 moves to the right over web 30 with die-cut labels 32 on it to an incidence position 61 where it is fully illuminating trailing edge 41, the state of both photodetectors is still the same as for butt-cut labels. So photodetector 38 is illuminated, while photodetector 37 is not.

However, as incident ray 21 continues to move to the right over the butt-cut labels, it next arrives at an incidence position 52 where it completely illuminates both the trailing label edge 41 and leading edge 42, thus causing reflected light to illuminate both photodetector 37 & 38 simultaneously. But in the case of die-cut labels, there is no incidence position that can cause both photodetectors to be illuminated simultaneously. So as incident ray 21 continues moving, it next comes to an incidence position 62, where the light is not impinging on any edge. So neither photodetector 37 & 38 is illuminated in the case of die-cut labels.

Finally, as incident ray 21 continues to move along web 30 with butt-cut labels 31 on it, incident ray 21 gets to an incidence position 53 where only leading edge 42 is illuminated. Similarly for the die-cut labels, an incidence position 63 is reached where only leading edge 42 is illuminated. So the final state of the repeating sequence of states is the same for both butt-cut and die-cut labels, with photodetector 37 being illuminated, and photodetector 38 not receiving light.

The combination of a difference in photodetector states when incident ray 21 is in position 52 (for butt-cut labels) and position 62 (for die-cut labels), and the sequence of photodetector states as the respective webs move along underneath incident ray 21 enables a detector using this embodiment to know whether it is sensing butt-cut or die-cut labels.

And since leading and trailing label edges are detected by different photodetectors, this first embodiment also would be able to sense which direction the web was moving with the appropriate circuitry and programming logic. The details of which will not be discussed here, because one skilled in the art of designing sensors would be well-acquainted with how to design-in that kind of functionality.

Second Embodiment

Figure 6:
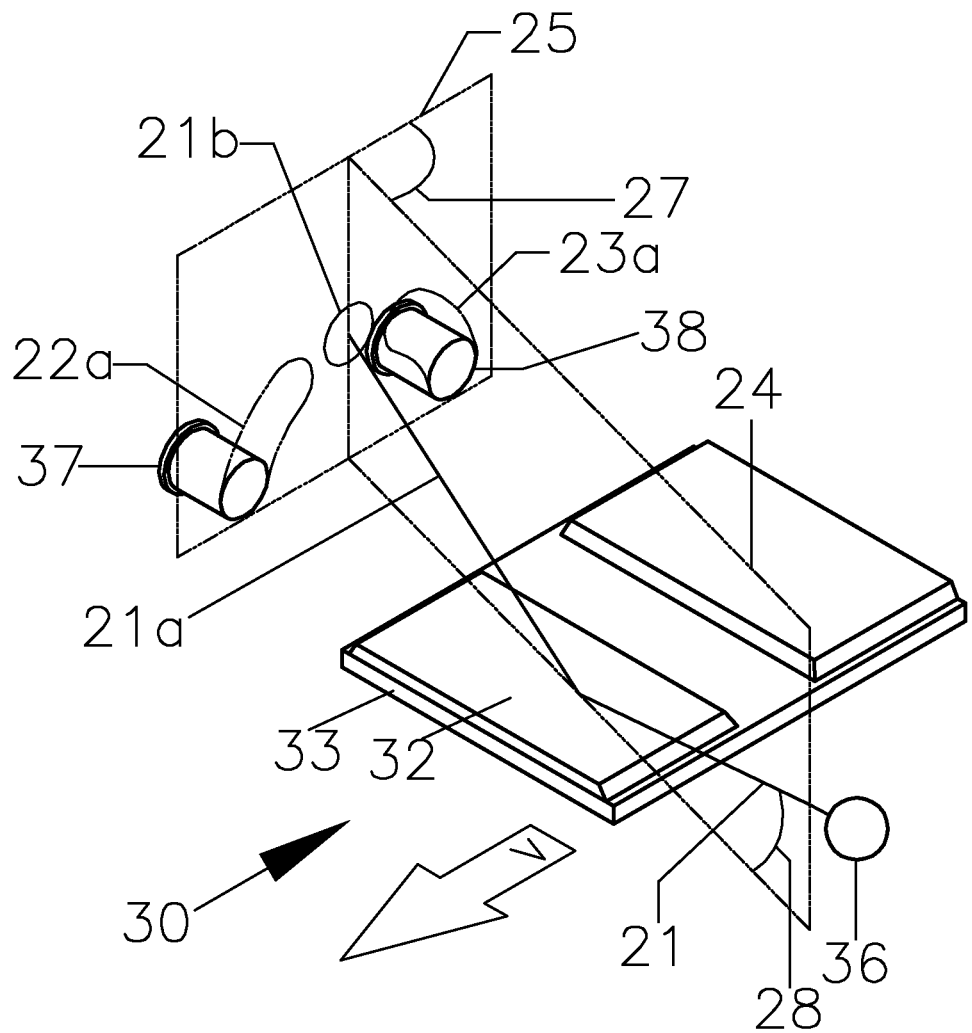
FIG. 6 shows the light reflecting off the flat surface stays in the plane of incidence after reflection when the planes of incidence and detection are not perpendicular to each other (2nd embodiment).
Figure 7:
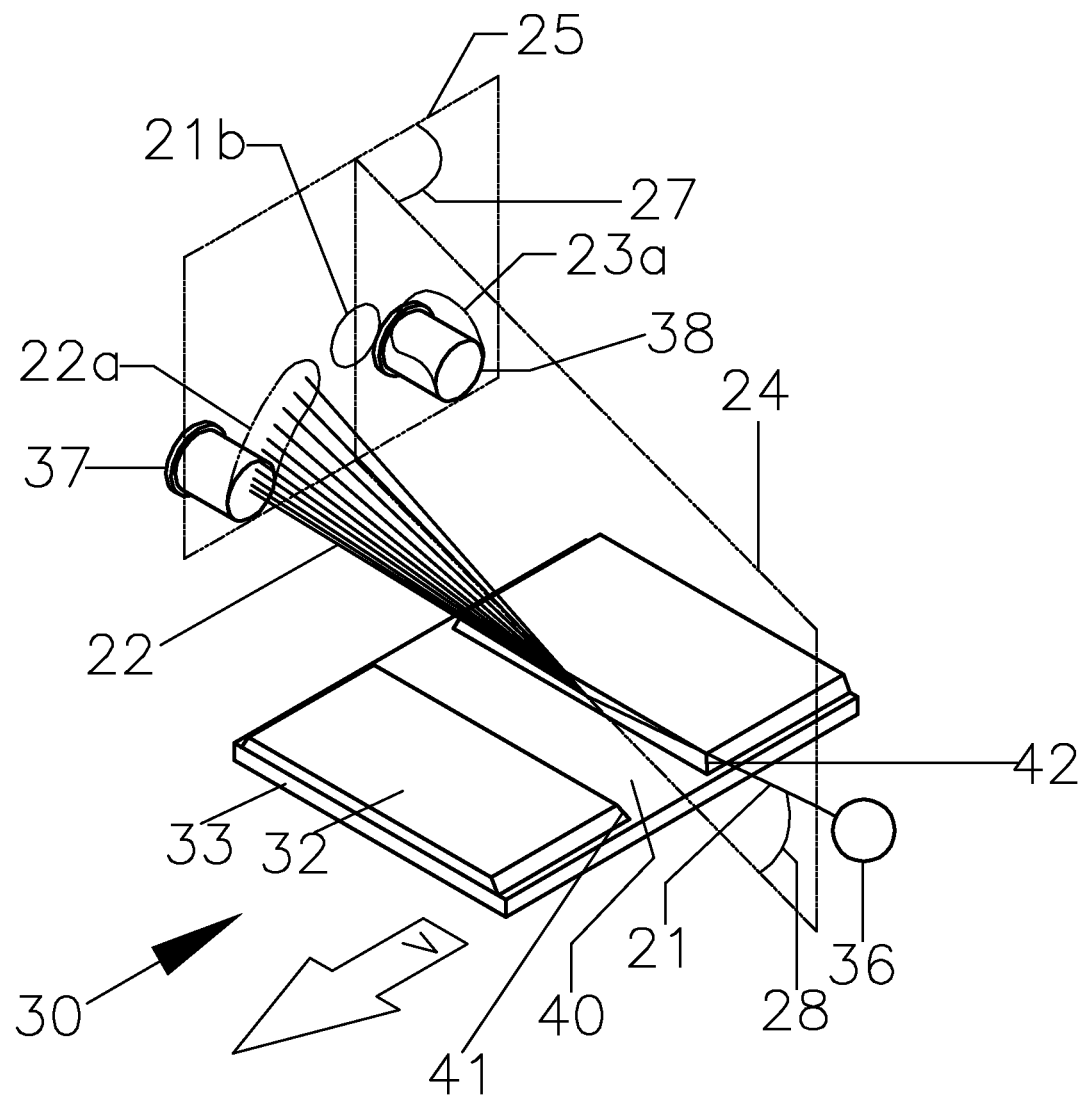
FIG. 7 shows the light reflecting off the leading edge of a label, and how it reflects out of the incidence plane (2nd embodiment).

FIGS. 6 and 7 show a possible alternative embodiment of the label sensing method, the only structural difference being that angle 27 is no longer 90°. The detection plane is still parallel to the direction of motion of web 30.

In the first embodiment, the light pattern formed in detection plane 25 by the various light beams that are reflected off flat surfaces and edges tends to be generally symmetrical on both sides of incidence plane 24. But due to the asymmetry of this arrangement, light spots 22a and 23a will no longer be symmetrical.

This embodiment as shown in FIG. 7, with angle 27 greater than 90°, may be useful at some point. But it may enhance the detection of leading edge 42 at the cost of worse detection of trailing edge 41. As angle 27 gets increasingly larger than 90°, trailing edge 41 will tend to be more and more in a shadow, and could at some value of angle 27 become undetectable if incidence angle 28 is sufficiently small. This is a situation where there could be a benefit to using a value of incidence angle 28 closer to the upper limit of 45°

This situation changes if angle 27 goes less than 90°. This scenario is not illustrated, but in that case, detection of trailing label edge 41 would be enhanced, while detection of leading label edge 42 would be diminished. But larger values of incidence angle 28 could also be of benefit in this scenario, as well.

Third Embodiment

Figure 8:
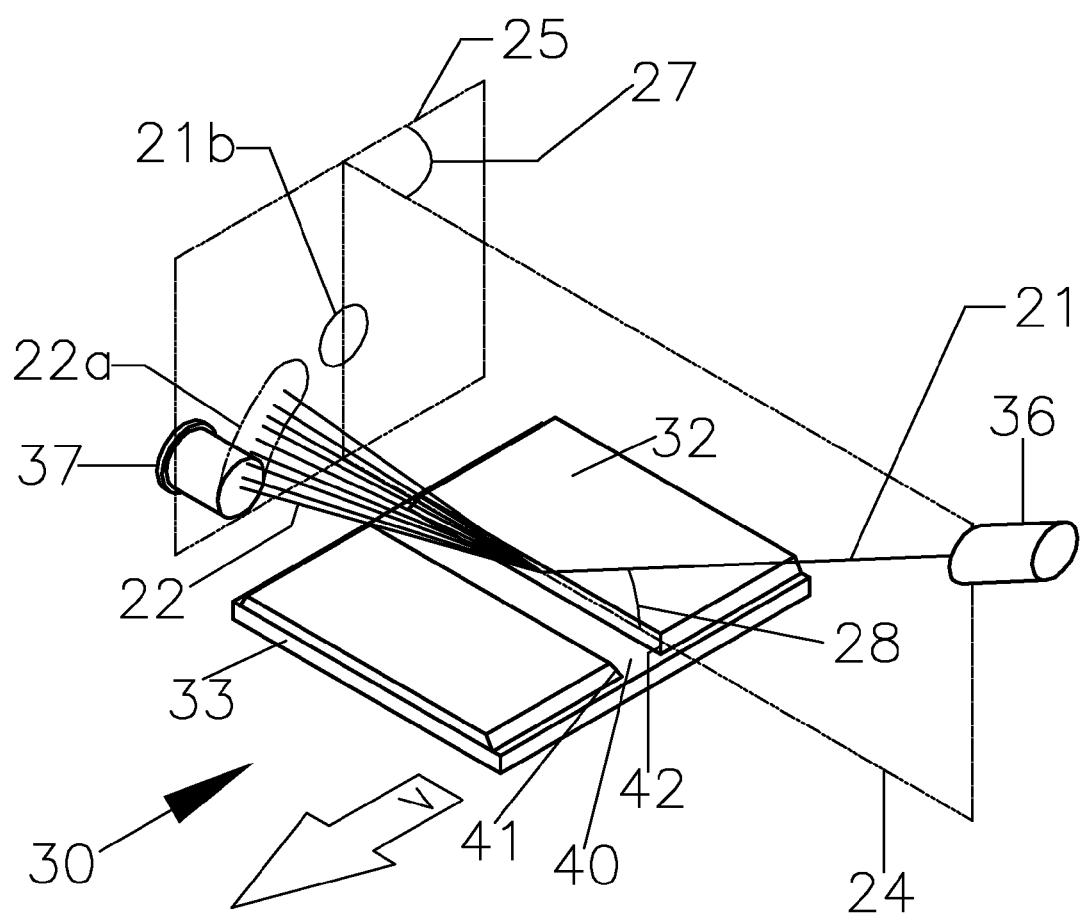
FIG. 8 shows the edge-detection method using only a single photodetector (3rd embodiment).

FIG. 8 illustrates a third embodiment that's simplified from the preceding examples. It shows the label-edge position at which leading edge 42 is detected. It uses only photodetector 37 instead of two photodetectors. This still enables the sensor to detect the leading label edges 42 of both butt-cut and die-cut labels. If one wanted to detect trailing label edges 41 instead, then photodetector 37 would be omitted and photodetector 38 would be used instead, and it would be positioned as shown in FIGS. 1-7. This embodiment would still detect the edges of both die-cut and butt-cut labels, but it wouldn't know which of the two kinds of labels it was sensing, and would be unable to tell which direction web 30 was moving.

This disclosure has not detailed any electronic circuits, programming flow charts, or any mechanical mounting features for any of the described components or web of labels, because all that is well-understood by any person skilled in the art.

CONCLUSIONS, RAMIFICATIONS, AND SCOPE

Thus the reader will see that the method of label detection described above does, in fact, enable detection of label types not previously possible with any of the prior art without going to the expense and complexity of vision systems, or using registration marks.

While this disclosure contains many specificities, these should not be construed as limitations on the scope, but rather as an exemplification of one or more embodiments thereof.

There are a number of changes that could be made singly or collectively to the components used to implement this method, and still do the same thing with just a slightly different look, but the fundamental function would remain exactly the same.

For example, a multipixel photodetector can be used whose sensitive area encompasses enough of detector plane 25 to include one or more of the light spots cited as being located in that plane. This may provide additional flexibility in sensing, although it would require more complex circuitry, and greater cost.

It may be possible to use a position-sensing-diode in place of one or more of the photodetectors.

It would be possible to use a light guide or other optical components to physically mount the light source in a different location, and then direct the emitted light beam to the proper location to meet the specifications of this method, without deviating from the teaching and spirit of this specification. The same could also be done with the photodetectors. They could be mounted elsewhere, use various optical methods that are well-known in order to collect the light from the light spots in the detector plane, and then redirect it to the remotely-mounted detectors.

It would be possible to add an photodetector somewhere in detector plane 25 that is specifically located outside any of the light spots identified in this disclosure. Such a photodetector could be used to detect the intensity of stray light, enabling the sensor to automatically reduce or cancel the ill affects of unwanted, stray light reflecting onto the detector plane.

It would be possible to have more than one light source, so there would be several incident ray 21's impinging on several locations across web 30.

And it would also be possible to scan incident ray 21 part-way across or all the way across web 30. This could be done by actually moving one or more parts to move the beam. Or if a laser is used to generate incident ray 21, then it could be run through or reflected off an optical component or assembly that would generate a line across the labels without having to physically move anything.

Accordingly, the scope should be determined not by the embodiments illustrated, but by the appended claims and their legal equivalents.

What is claimed is:

1. A device for detecting the position of the leading and trailing edges of labels removably attached to a liner in a moving and continuous web of labels, said device comprising:

a light source projecting a small diameter light beam onto said continuous web of labels wherein said continuous web of labels moves in a direction, and wherein each label in said web of labels has a top surface, a leading edge, and a trailing edge;

wherein said small diameter light beam is projected at an angle across said direction;

said small diameter light beam further projected at an incident angle to said top surface of said labels to create a first reflected light beam, wherein said small diameter light beam and said first reflected light beam are in an initial incidence and reflection plane;

a photodetector mounted on either side of said initial incidence and reflection plane;

said small diameter light beam further projected to create a second reflected light beam when said small diameter light beam reflects off said leading edge and a third reflected light beam when said small diameter light beam reflects off said trailing edge and said second and third reflected light beams deflect outside said initial incidence and reflection plane; and wherein said second reflected light beam or said third reflected light beam is detected by said photodetector.

2. The device for detecting of claim 1 wherein said continuous web of labels moves in said direction such that said small diameter light beam is projected onto said leading edge to produce said second reflected light beam, said top surface to produce said first reflected light beam, and said trailing edge to produce said third reflected light beam, and wherein said photodetector detects said second or third reflected light beam.

3. The device for detecting of claim 1 wherein said incident angle is less than 45 degrees.

4. The device for detecting of claim 1 wherein said incident angle is between 7 and 20 degrees.

5. The device for detecting of claim 1 wherein said light beam is projected at 90 degrees across said direction.

6. A device for detecting the position of the leading and trailing edges of labels removably attached to a liner in a moving and continuous web of labels, said device comprising:

a light source projecting a small diameter light beam onto said continuous web of labels wherein said continuous web of labels moves in a direction, and wherein each label in said web of labels has a top surface, a leading edge, and a trailing edge;

wherein said small diameter light beam is projected at an angle across said direction;

said small diameter light beam further projected at an incident angle to said top surface of said labels to create a first reflected light beam, wherein said small diameter light beam and said first reflected light beam are in an initial incidence and reflection plane;

two photodetectors;

said photodetectors mounted on opposite sides of said initial incidence and reflection plane from each other;

said small diameter light beam further projected to create a second reflected light beam when said small diameter light beam reflects off said leading edge and a third reflected light beam when said small diameter light beam reflects off said trailing edge and said second and third reflected light beams deflect outside said initial incidence and reflection plane; and wherein said second reflected light beam is detected by one of said photodetectors, and said third reflected light beam is detected by the other said photodetector.

7. The device for detecting of claim 6 wherein said continuous web of labels moves in said direction such that said small diameter light beam is projected onto said leading edge to produce said second reflected light beam, said top surface to produce said first reflected light beam, and said trailing edge to produce said third reflected light beam, and wherein one of said photodetectors detects said second reflected light beam, and the other said photodetector detects said third reflected light beam.

8. The device for detecting of claim 6 wherein said incident angle is less than 45 degrees.

9. The device for detecting of claim 6 wherein said incident angle is between 7 and 20 degrees.

10. The device for detecting of claim 6 wherein said light beam is projected at 90 degrees across said direction.

* * * * *